United States Patent [19]

Sawairi

[11] Patent Number: 4,470,099
[45] Date of Patent: Sep. 4, 1984

[54] LAMINATED CAPACITOR

[75] Inventor: Hitoshi Sawairi, Hirakata, Japan

[73] Assignee: Matsushita Electric Industrial Co., Ltd., Kadoma, Japan

[21] Appl. No.: 419,205

[22] Filed: Sep. 17, 1982

[51] Int. Cl.$^3$ .............................................. H01G 4/38
[52] U.S. Cl. ...................................................... 361/328
[58] Field of Search ......................................... 361/328

[56] References Cited

U.S. PATENT DOCUMENTS 1,298,396  3/1919  Pruessman ........................... 361/328
4,389,703  6/1983  Morel et al. .......................... 361/328

FOREIGN PATENT DOCUMENTS 145008  9/1920  United Kingdom ................ 361/328
1324009  7/1973  United Kingdom ................ 361/328

*Primary Examiner*—Donald A. Griffin
*Attorney, Agent, or Firm*—Stevens, Davis, Miller & Mosher

[57] ABSTRACT

A laminated capacitor with a plurality of capacitor units integrated therein, in which the hot-side electrode layer of a capacitor unit and the earth-side electrode layer of another capacitor unit are formed by being printed on the same surface of a dielectric layer, so that the coupling capacity between the electrodes of the capacitor units is reduced by the shielding effect of the earth-side electrodes.

5 Claims, 9 Drawing Figures

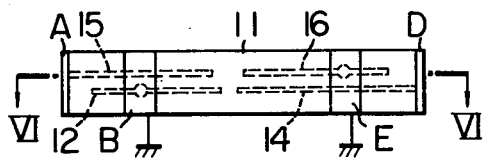
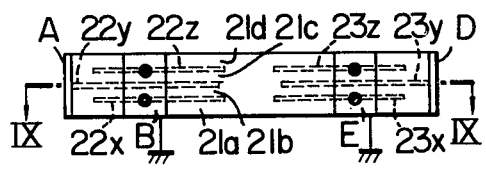
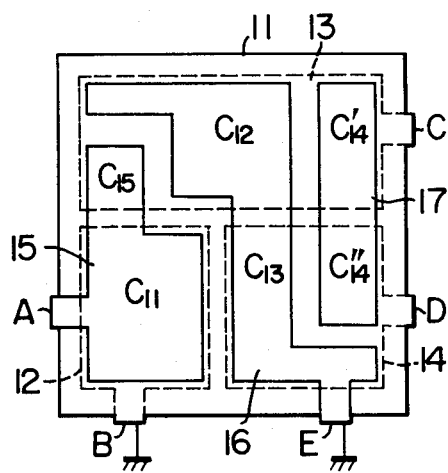
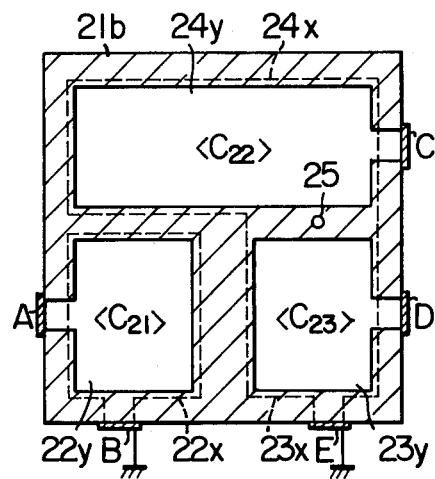
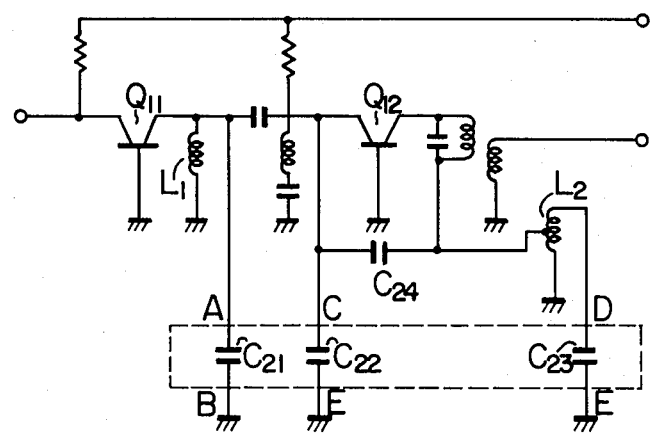

LAMINATED CAPACITOR

BACKGROUND OF THE INVENTION

The present invention relates to a laminated capacitor comprising a plurality of capacitor units incorporated therein, in which the coupling capacity between the capacitor units is greatly reduced thereby minimizing the coupling between different circuits with which the capacitor units are connected.

For example, if the antenna tuning circuit and the local oscillator circuit of a superheterodyne receiver are coupled with each other, a drawing effect occurs or the oscillation voltage is externally radiated undesirably through the antenna circuit as an unrequired radiation, thereby posing the problem of interference, in the case where frequencies close to one another are involved. Conventionally, in order to obviate this problem, circuits are arranged with a physical space therebetween or one of the circuits is covered with a shield to prevent them from being coupled with each other. The construction limits a reduction in overall circuit size.

Another means for reducing the size of circuits now in use is the employment of composite parts. A laminated capacitor having capacitor units of substantially the same capacitance, for example, can be made in integral form since they have substantially the same area of electrode plates. If the capacitor units connected to the circuits are integrated with each other as mentioned above, however, the circuits are always coupled with each other, therefore, it has been impossible to use a composite laminated capacitor for size reduction.

SUMMARY OF THE INVENTION

Accordingly, it is an object of the present invention to provide a laminated capacitor having decreased coupling capacity between capacitor units in order to obviate the above-mentioned problems.

According to the present invention, there is provided a laminated capacitor, wherein the electrode layer on a hot side of a capacitor unit and the electrode layer on an earth side of another capacitor unit are printed on the same plane, and the electrode layers on the earth side of the capacitor units each have a shielding effect, thereby reducing the coupling capacity between the capacitor units.

BRIEF DESCRIPTION OF THE DRAWINGS

FIG. 5 is a front view of the capacitor of FIG. 4;

FIG. 6 is a plan view by a section taken along the line VI—VI in FIG. 5;

FIG. 7 is a circuit diagram showing another example of the high frequency circuit using the laminated capacitor according to the present invention;

FIG. 8 is a fron view of th capacitor of FIG. 7; and

FIG. 9 is a plan view by a section taken along the line IX—IX in FIG. 8.

DESCRIPTION OF THE PREFERRED EMBODIMENTS

Figure 1:
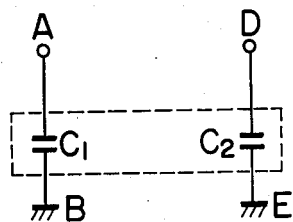
FIG. 1 is a circuit diagram showing an embodiment of a laminated capacitor according to the present invention.
Figure 2:
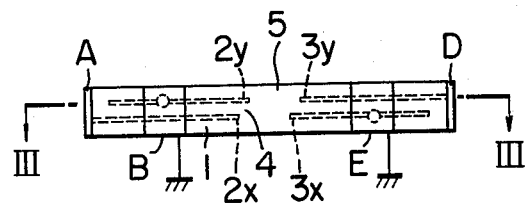
FIG. 2 is a front view of the capacitor of FIG. 1.
Figure 3:
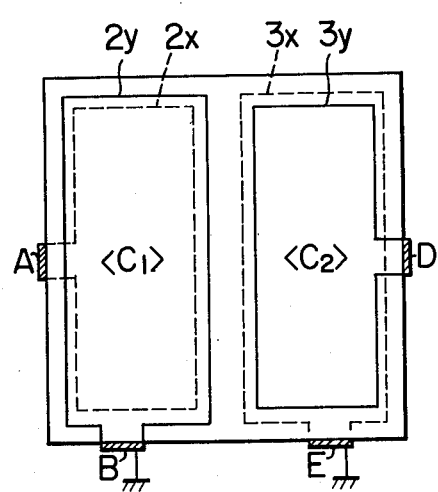
FIG. 3 is a plan view by a section taken along line III—III in FIG. 2.

An embodiment of the present invention will be described below with reference to the accompanying drawings. A cicuit diagram of an embodiment is shown in FIg. 1, in which capacitor units $C_1$ and $C_2$ have terminals A and D respectively connected to the hot side and terminals B and E respectively connected to the eart h side. FIG. 2 is a front view of the embodiment under consideration, and FIG. 3 is a plan view by a numeral 1 designates a dielectric layer, numerals $2x$, $3x$ electrode layers, numeral 4 a dielectric layer, $2y$, $3y$ electrode layers, and numeral 5 a dielectric layer, which are sequentially formed by being printed. Each of the electrode layers has a part thereof led to the edge of the capacitor, at which a conductor is provided to form a terminal. The electrode layers $2x$ and $2y$ make up a capacitor unit $C_1$, and the electrode layers $3x$ and $3y$ make up a capacitor $C_2$.

In this embodiment, terminals A and E are connected to the electrode layers $2x$ and $3x$ respectively in the same plane. As shown in FIG. 1, the terminal A is connected to the hot side, and the terminal E is connected to the earth side. The electrode layers $2y$ and $3y$ on the other plane are connected to the earth-side terminal B and the hot-side terminal D respectively.

Even if a large dielectric material is used in this construction, the coupling capacity between the electrode layers $2x$ and $3y$ (terminals A and D) connected to the earth is very small due to the fact that the electrode layers $2y$ and $3x$ connected to the earth each have the effect of shielding, thus making it possible to dampen the coupling between the circuits of different systems to which the terminals A and D are connected. The effect of shielding is obtained since electrode layers of the same polarity, that is, electrode layers to be connected to the earth side or those to be connected to the hot-side, are not formed on the same plane. By forming electrode layers in this way, it is possible to remove a capacity between electrode layers of the same polarity which capacity may exist when electrode layers of the same polarity are formed on the same plane.

Further, by making the shape of the electrode layers $2y$ and $3x$ connected to the earth larger than that of the other electrode layers $2x$ and $3y$ respectively, the coupling capacity between the terminals A and D can be further reduced, and also it is possible to absorb errors of positional accuracy in the printing process and reduce the capacity variations.

Figure 4:
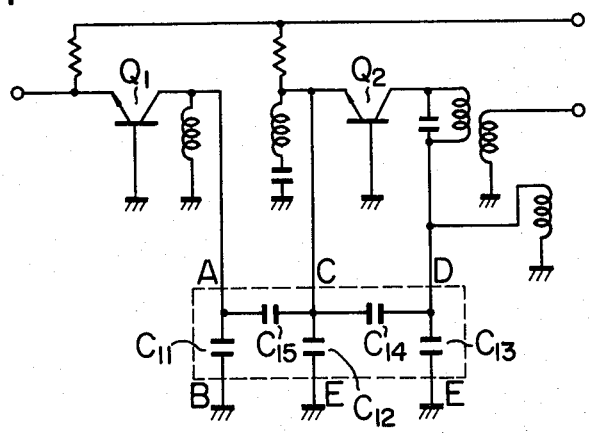
FIG. 4 is a circuit diagram showing an example of a high frequency circuit using a laminated capacitor according to the present invention.

FIG. 4 shows an example of the high frequency circuit, in which reference character $Q_1$ designates a high frequency amplifying transistor, and $Q_2$ a conversion transistor. The capacitors $C_{11}$, $C_{12}$ and $C_{13}$ of the earth circuit have an end thereof connected to the earth, and the other end thereof connected to the hot side. By arranging the plurality of capacitors surrounded by the dashed line integrally with each other, the size of the device is greatly reduced. If a distributed capacity other than the one shown exists between the capacitors $C_{11}$ and $C_{12}$ or $C_{13}$, however, the circuits are coupled easily causing abnormal oscillations or unnecessary radiation.

In order to prevent unnecessary distributed capacity between the hot side terminals, the electrode layers at least in the same plane are so constructed that the electrode layers on the hot side are not adjacent to each other. In this manner, the coupling between the circuits is prevented, thus realizing a laminated capacitor greatly contributing to the reduction of the size of the device involved.

An embodiment of the laminated capacitor according to the present invention will be described with reference to FIGS. 5 and 6. FIG. 5 shows a front view, and FIG. 6 a plan view by a section taken along the line VI—VI. Numeral 11 designates a dielectric material making up an element, and numerals 12, 13, 14 electrode layers formed by being printed on the same plane. From these electrode layers, leads are led to the edge of the capacitor where they are connected to the terminals B, C and D respectively. As it is clearly shown in FIG. 4, the terminal B is connected to the earth side, and the terminals C and D are connected to the hot side.

Electrode layers 15, 16 and 17 are also formed by being printed on another plane above the plane containing the electrode layers 12, 13 and 14 through the dielectric material therebetween. The electrode layer 15 is in partially opposed relation with the electrode layers 12 and 13 respectively thereunder, and the opposed parts thereof form capacitor units $C_{11}$ and $C_{15}$ respectively. A lead is also led from this electrode layer 15 to the edge of the device and is provided with the hot-side terminal A. The electrode layer 16 is in partially opposed relation with the electrode layers 13 and 14 thereunder respectively, and the opposed portions thereof form capacitor units $C_{12}$ and $C_{13}$ respectively. The electrode layer 16 is connected to the earth-side terminal E at the edge of the device. The capacitor units $C_{12}$ and $C_{13}$ are connected to a common grounding terminal E for the reason that a local oscillation current flows through each of the capacitors in the circuit of FIG. 4.

Further, the electrode layer 17 is partially in opposed relation with the electrode layers 13 and 14, so that capacitor units of capacitance $C_{14}'$ and $C_{14}''$ are formed by the opposed portions thereof. In other words, the capacitor unit $C_{14}$ is made up of a series circuit of $C_{14}'$ and $C_{14}''$ in the circuit of FIG. 4, so that $$C_{14} = \frac{C'_{14} \cdot C''_{14}}{C'_{14} + C''_{14}}.$$

Both the capacitor units $C_{14}$ (series combined capacitance) and $C_{15}$ are inserted between hot-side terminals (that is, neither of the terminals is grounded), and the electrodes 15 and 17 thereof are provided in the right and left sides divided by the electrode layer 16 connected to the earth side.

In this configuration, the hot-side electrodes 15 and 14 of the capacitor units $C_{11}$ and $C_{12}$ are positioned in different planes, and the hot-side electrode of a capacitor unit is adjacent to the earth-side electrode of the other capacitor unit in the same plane (between the electrode layers 15 and 16 and between the electrode layers 12 and 14), thus preventing the coupling between the capacitor units $C_{11}$ and $C_{12}$. This is also the case with the capacitor units $C_{11}$ and $C_{13}$.

The hot-side electrode layer 15 of the capacitor units $C_{11}$ and $C_{15}$ is in the same plane as the hot-side electrode layer ($C_{14}'$, $C_{14}''$) 17 of the capacitor unit $C_{14}$, and there is the electrode layer 16 connected to the earth therebetween. This electrode layer 16 also provides an earth electrode for the capacitor units $C_{12}$ and $C_{13}$, and therefore the unnecessary distributed capacity other than shown in FIG. 4 is very small, thus preventing the coupling between the circuits. Further, by forming the earth-side electrode 16 so as to separate the hot electrodes on the same plane as described above, the area of the device is reduced, thus reducing the size thereof.

FIG. 7 shows an example of the high frequency circuit, in which a transistor $Q_{11}$ is for high frequency amplification and a transistor $Q_{12}$ is for frequency conversion. Reference characters $C_{21}$, $C_{22}$ and $C_{23}$ respectively designate capacitor units of comparatively small capacitance with an end of each thereof connected to the earth. The laminated capacitor according to an embodiment described below comprises the capacitor units $C_{21}$, $C_{22}$ and $C_{23}$ integrally constructed without any coupling between the circuits.

A front view of the laminated capacitor according to the embodiment under consideration is shown in FIG. 8, and a plan view by a section taken along the line IX—IX in FIG. 8 is shown in FIG. 9. Numerals 21a, 21b, 21c and 21d designate dielectric insulation layers, between which electrode layers 22x, 22y, 22z, 23x, 23y, 23z, 24x and so on are formed by printing. Specifically, the electrode layers are made by screen-printing and firing using palladium. The electrode layers are exposed to the edge of the capacitor and connected to the terminals A, B, C, D and E respectively. More specifically, the electrode layer 22y is connected to the terminal A, the electrode layers 22x and 22z to the terminal B, electrode layer 24y to the terminal C, the electrode layer 23y to the terminal D, and the electrode layers 23x and 23z to the terminal E. The electrode layers 14x and 24z (not shown), which take the form of large electrode plates connected to the electrode layers 23x and 23z, will be hereinafter referred to by numerals 23x and 23z respectively. In the above example the electrode layers 23x and 23z are connected at the terminal E, but instead thereof they may be connected to each other by use of a through hole 25 as shown in FIG. 9. In this case, a hole is formed when printing the dielectric layers 21b and 21c, and this hole is filled with a conductor material when printing the electrode layers 22z and 23z (=24z).

The electrode layers making up the electrode plates of the capacitor units are formed simultaneously for each plane, so that the electrode layers 22x and 23x (=24x) are formed by being printed at the same time, as are the electrode layers 22y, 23y and 24y, and the electrode layers 22z and 23z respectively.

In the aforementioned embodiment, the hot-side electrode layers 22y, 23y and 24y connected to the terminals A, C and D are shielded by the electrode layers 22x and 22z or 23x and 23z connected to the earth terminals B and D. Therefore, in spite of the fact that a plurality of capacitor units are laminated and formed simultaneously by printing for each plane, the coupling never occurs when used in the circuit of FIG. 7.

If the electrode layers 22x, 23x, 22z and 23z connected to the earth are formed somewhat larger than the hot-side electrodes as shown in FIG. 9, on the other hand, the capacitance variations which otherwise might be caused by the low positional accuracy in the printing process is prevented, and also it is possible to prevent a decrease of the shielding effect.

The construction of the above-mentioned embodiment comprises two earth-side electrode layers for one hot-side electrode layer. The same process may be repeated to construct five or more odd-numbered electrode layers, thus forming a plurality of capacitor units shielded along the thickness thereof.

I claim:
1. A laminated capacitor comprising a plurality of capacitor units arranged in parallel, each of said capaci- tor units being constructed as a laminated assembly of layered dielectric materials and internal electrode layers, layered one after the other, with the number of layers of said internal electrode layers being an even number which is at least two, adjacent capacitor units being arranged such that an internal electrode layer of one of the adjacent capacitor units and an internal electrode layer of another of the adjacent capacitor units are formed on the same plane, and are connected to an earth terminal and hot terminal respectively.

2. A laminated capacitor according to claim 1, wherein at least the electrode layers connected to said earth terminal among a plurality of electrode layers formed on a common plane are not adjacent to each other, and electrode layers not connected to said earth terminal are provided on a plane divided by an electrode layer connected to said earth terminal.

3. A laminated capacitor comprising a plurality of capacitor units integrated therein, said capacitor units having respective electrode layers, at least one of the electrode layers of one capacitor unit being on the same plane with at least one of the electrode layers of another capacitor unit, said co-planar electrode layers being formed simultaneously, said laminated capacitor containing an odd number of three or more electrode layers, the odd numbered ones of said electrode layers being connected to each other by a through hole and being further connected to an earth terminal which extends out of said laminated capacitor.

4. A laminated capacitor according to claim 3, wherein at least the electrode layers connected to said earth terminal among a plurality of electrode layers formed on a common plane are not adjacent to each other, and electrode layers not connected to said earth terminal are provided on a plane divided by an electrode layer connected to said earth terminal.

5. A laminated capacitor comprising a plurality of capacitor units integrated therein each of said capacitor units being constructed as a laminated assembly of layered dielectric materials and internal electrode layers, layered one after the other, said electrode layers being classified as hot-side electrode layers and earth-side electrode layers, at least a hot-side electrode layer of one capacitor unit and an earth-side electrode layer of another capacitor unit being formed by being printed on the same plane, and wherein at least the earth-side electrode layers among a plurality of electrode layers formed on a common plane are not adjacent to each other, and electrode layers which are not earth-side electrode layers are provided on a plane divided by an earth-side electrode layer, and wherein the electrodes of capacitor units on the same plane are printed simultaneously, the electrode layers being provided in an odd number of at least three, the odd-numbered ones of the electrode layers being connected to each other by a through hole and being further connected to an earth terminal which extends out of said laminated capacitor.

* * * * *